UNITED STATES PATENT OFFICE.

CHRISTOPHER RIS, OF BASLE, SWITZERLAND, ASSIGNOR TO JOHN R. GEIGY & CO., OF SAME PLACE.

BLACK SULFUR DYE.

SPECIFICATION forming part of Letters Patent No. 645,738, dated March 20, 1900.

Application filed September 9, 1899. Serial No. 729,943. (Specimens.)

*To all whom it may concern:*

Be it known that I, CHRISTOPHER RIS, a citizen of the Republic of Switzerland, residing in Basle, in the Republic of Switzerland, have invented certain new and useful Fast-Black Coloring-Matters, of which the following is a specification.

This invention (for which patents have been applied for in Germany, G. 13,484, under date of June 1, 1899, and in France, No. 286,571, under date of March 6, 1899) relates to new black coloring-matters which dye unmordanted cotton in fast-black shades.

In order to obtain the new coloring-matters, a paraämidophenol is melted together with an oxyazo compound and sulfur at a temperature of about 200° centigrade. A condensation takes place, and new black coloring-matters are obtained which are quite different from those obtained from the paraamidophenol or from the oxyazo compound when melting each one with sulfur alone.

The new coloring-matters may be obtained by the process illustrated in the following examples.

Example I: Forty-four kilos of paraämidophenol, forty kilos of oxyazobenzene, and forty-five kilos of sulfur are melted together in a vessel furnished with a stirring mechanism at a temperature of about 200° to 220° centigrade until the development of sulfureted hydrogen and of anilin is almost finished and the mass has become dry. The melt is then pulverized. A similar result is obtained if a diluent, such as glycerin, is added to the melting mixture.

Example II: Forty-four kilos of paraämidophenol, forty kilos of oxyazobenzene, thirty kilos of glycerin, and forty-five kilos of sulfur are melted together as described in the preceding example. In this case a longer time elapses before the mass attains a dry state.

In order to obtain the coloring-matter in a condition so that it will dissolve easily in water, it is dissolved in an alkali, such as caustic-soda lye of 40° Baumé or sodium sulfid or caustic-soda lye with addition of sulfur, and evaporated to dryness.

Example III: The coloring-matter obtained according to example I or II is dissolved in two hundred kilos of caustic-soda lye of 40° Baumé and then heated to a temperature of about 150° to 170° centigrade until the mass becomes very thick and grows hard when left to cool. Then the melt is broken in pieces.

In these examples paraämidophenol may be substituted by amidocresol $$(CH_3 : OH : NH_2 = 1 : 2 : 5.)$$

Also other oxyazo compounds may be used with a very similar result—such as toluene-azo-phenol, sulfoacids, or carbonic acids of oxyazobenzene, sulfo-toluene-azo-phenol—and also the corresponding oxyazo compounds which are derived from cresol or resorcin instead of phenol. The relative quantities of the components used for the condensation may be altered within some limits and also the temperature of the reaction.

The following are the characteristics of the new black coloring-matter: It forms black pieces which dissolve easily in water with a dark bluish-olive color. By addition of acids a brown precipitate is obtained which turns by addition of a bichromate into a deep black. The coloring-matter is scarcely soluble in alcohol and insoluble in ether and benzene. Concentrated sulfuric acid gives a dark-green solution. In a hot bath containing common salt or Glauber's salt the color dyes unmordanted cotton bluish black, which may be fixed by means of oxidizing agents. Bichromates, sulfate of copper, or chlorid of iron produces a deep black of great fastness to acids and alkalies, to soap, and to the action of light. When treated with peroxid of hydrogen, black shades are also obtained.

The chemical constitution of the new coloring-matter cannot yet be ascertained, and the following formula is given only as probable:

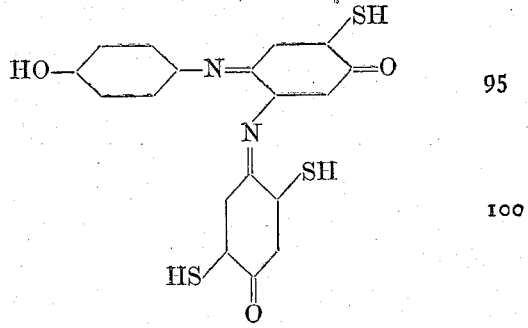

Having thus described my invention, I claim as new and desire to secure by Letters Patent—

1. The new black coloring-matters obtained by melting a paraämidophenol together with an oxyazo compound and with sulfur, to which mixture glycerin may be added, at a temperature of about 200° centigrade, then dissolving the mass in an alkali and evaporating to dryness, the said coloring-matter forming black pieces easily soluble in water with a dark bluish-olive color, precipitated by acids in brown flocks which become deep black by addition of a bichromate, scarcely soluble in alcohol, insoluble in ether and benzene, soluble in concentrated sulfuric acid with a dark-green color, and dyeing unmordanted cotton bluish-black shades which may be fixed by oxidation into a deep black of great fastness, substantially as described.

2. As a new article of manufacture, the herein-described black coloring-matter obtained from paraämidophenol, oxyazobenzene and sulfur, which forms black pieces, easily soluble in water with a dark bluish-olive color, precipitated by acids in brown flocks which become deep black by addition of a bichromate, scarcely soluble in alcohol, insoluble in ether and benzene, soluble in concentrated sulfuric acid with dark-green color, and dyeing unmordanted cotton bluish-black shades which may be fixed by oxidation into a deep black of great fastness, substantially as described.

In testimony that I claim the foregoing as my invention I have signed my name in presence of two subscribing witnesses.

CHRISTOPHER RIS.

Witnesses:
GEORGE GIFFORD,
ALBERT GRAETER.